United States Patent Office.

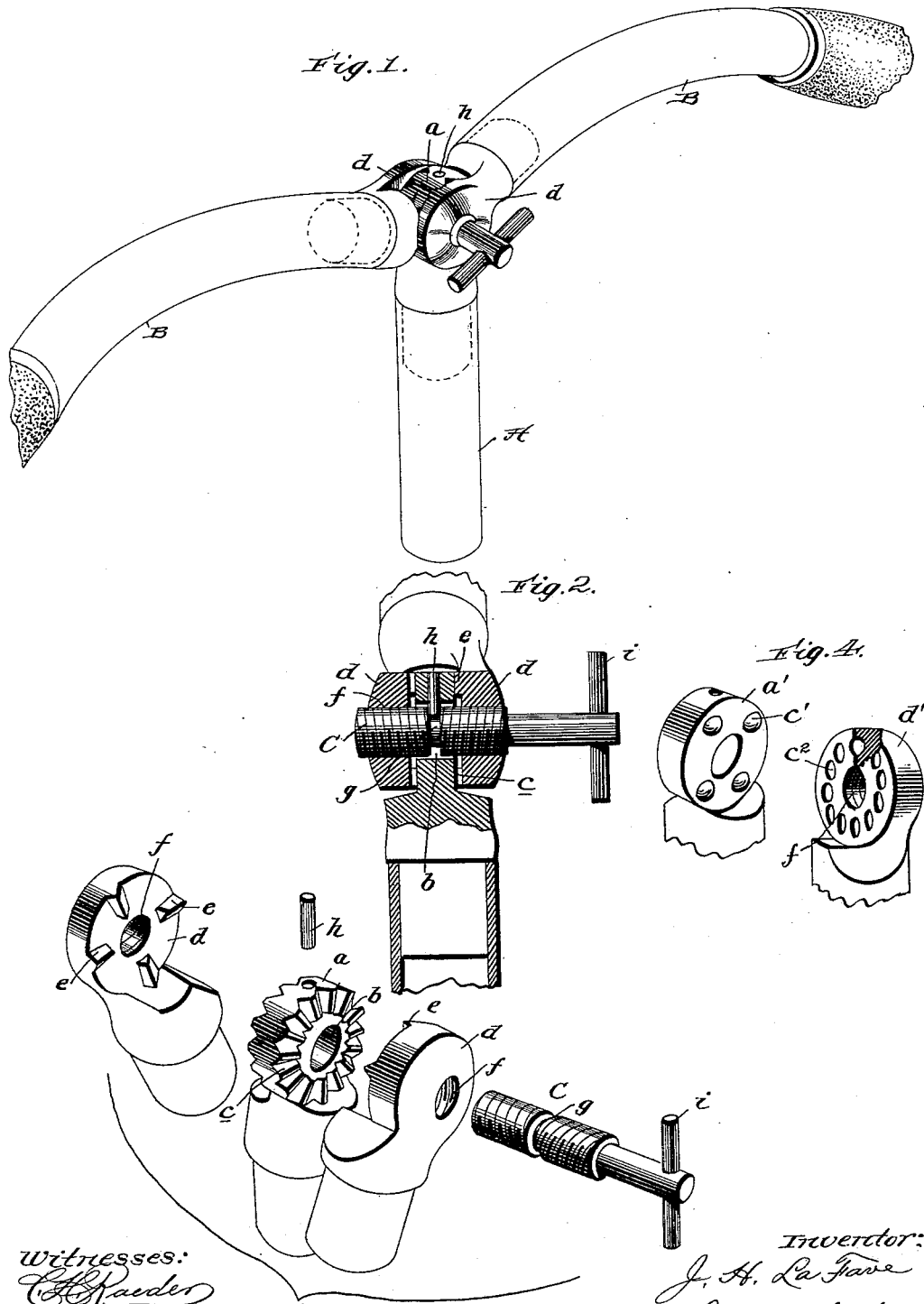

JOSEPH H. LA FAVE, OF TOLEDO, OHIO, ASSIGNOR OF ONE-HALF TO RAY CONKLIN, OF SAME PLACE.

ADJUSTABLE HANDLE-BAR.

SPECIFICATION forming part of Letters Patent No. 602,625, dated April 19, 1898.

Application filed December 31, 1897. Serial No. 664,956. (No model.)

*To all whom it may concern:*

Be it known that I, JOSEPH H. LA FAVE, a citizen of the United States, residing at Toledo, in the county of Lucas and State of Ohio, have invented certain new and useful Improvements in Adjustable Handle-Bars; and I do declare the following to be a full, clear, and exact description of the invention, such as will enable others skilled in the art to which it appertains to make and use the same.

My invention relates to that class of handle-bars for bicycles which comprise a stem and two handle-bar sections so connected with the stem that they may be adjustably fixed in various positions; and its novelty and many advantages will be fully understood from the following description and claims when taken in conjunction with the annexed drawings, in which—

Figure 1 is a perspective view of a complete handle-bar embodying my invention. Fig. 2 is an enlarged transverse section taken through the connection between the stem and handle-bar sections, with the connecting-bolt in elevation. Fig. 3 comprises disconnected perspective views of parts included in the handle-bar, and Fig. 4 comprises similar views of a modification.

Referring by letter to said drawings, A designates the stem of my improved handle-bar, which is designed to be placed and fixed in the steering-head of a bicycle in the ordinary manner. This stem A terminates at its upper end in a head $a$, and such head, which is preferably circular in form, has a central aperture $b$, and also has clutch-teeth $c$ on its opposite sides or faces, as shown.

B designates the adjustable handle-bar sections. These sections B have portions $d$ at their inner ends, adapted to rest at opposite sides of the head $a$ of stem A, and they also have clutch-teeth $e$ on their inner sides or faces and central threaded apertures $f$, the threads of one aperture being right hand and those of the other left hand, as shown in Fig. 2, for a purpose presently described. The teeth $e$ of the said portions $d$ are designed to engage the teeth of the head $a$, so as to fix the sections B with respect to the stem, while the apertures $f$ are adapted to coincide with the aperture $b$ and receive a connecting-bolt C. This bolt C is of such diameter as to turn loose in the aperture of the stem-head $a$, and is provided with a circumferential groove $g$ to receive a pin $h$, which is arranged in the head $a$ and has for its purpose to hold the bolt against endwise movement. Said bolt is also provided with right and left hand threads to engage the corresponding threads in the apertures $f$. In virtue of this it will be seen that when the bolt is turned in one direction the portions $d$ will be moved away from the head $a$ and their clutch-teeth will be disengaged from those of the head, in consequence of which the handle-bar sections will be rendered loose on the bolt and may be freely moved to the position desired. It will also be observed that when the bolt is turned in the opposite direction to that just stated the portions $d$ will be moved toward the head $a$ and the clutch-teeth on the meeting faces of the portions $d$ and head $a$ will be engaged, with the result that the handle-bar sections will be securely fixed with respect to the stem.

The bolt is preferably provided with a suitable handle $i$, so as to permit of the manipulations described being effected by hand.

It will be appreciated from the foregoing that I have provided an adjustable handle-bar which is extremely simple and strong and one which permits of the adjustable sections being quickly and easily placed and fixed in any desired position. It will also be observed that the bar-sections are loosened and tightened by the manipulation of a single bolt and that the construction is such that there is no liability of the handle-bar sections casually becoming loose when they are properly fixed in position.

I prefer to employ the connecting-bolt with right and left hand threads to engage corresponding threads in the apertures of the sections B, for the reason stated.

In lieu of providing the meeting faces of the head and the inner end portions of the handle-bar sections with teeth $c$ $e$, the one may be provided with teats or projections to take into seats or depressions in the other. For instance, (see Fig. 4,) the head $a'$ may be provided with four (more or less) teats or projections $c'$ on each of its opposite sides, while the inner portions $d'$ of the handle-bar sections may be provided in their inner faces with a greater number of seats or depressions $c^2$, designed to receive the teats $c'$ and permit of the said handle-bar sections being adjustably fixed in various positions by the screw C, before described.

Having thus described my invention, what I claim is—

1. An adjustable handle-bar for bicycles comprising handle-bar sections provided with portions having clutch-faces and also having transverse apertures one with right-hand threads and the other with left-hand threads, a stem adapted to be connected with the steering-head of a bicycle and provided with a head interposed or sandwiched between the portions of the handle-bar sections and having clutch-faces meeting those of said portions and a transverse aperture coincident with the threaded apertures of the portions, and a connecting-bolt extending through the apertures of the stem and handle-bar sections and having right and left hand threads engaging the corresponding threads of the handle-bar sections, substantially as specified.

2. The handle-bar described comprising the stem with the head at its upper end having clutch-teeth on its opposite sides and also having a transverse aperture, the handle-bar sections terminating at their inner ends in portions disposed at opposite sides of the head on the stem and having clutch-teeth on their inner sides engaging those of the head and also having transverse apertures one with right-hand threads and the other with left-hand threads, the connecting-bolt extending through the apertures of the head and handle-bar sections and having right and left hand threads engaging the corresponding threads of the handle-bar sections and also having a circumferential groove at its middle, and a pin arranged in the head of the stem and extending into said groove, substantially as specified.

In testimony whereof I affix my signature in presence of two witnesses.

JOSEPH H. LA FAVE.

Witnesses:
FREDERICK C. SCHAAL,
AUG. WOLPERT.